US012172705B2

(12) United States Patent
Gill et al.

(10) Patent No.: US 12,172,705 B2
(45) Date of Patent: Dec. 24, 2024

(54) SPLIT TAILGATE STORAGE AND ACCESSORY SYSTEM

(71) Applicant: ABC Technologies Inc., Toronto (CA)

(72) Inventors: Harman Gill, Brampton (CA); Avinash Jayakumar, Mississauga (CA); Usman Dulatov, Newmarket (CA)

(73) Assignee: ABC TECHNOLOGIES INC. (CA)

( * ) Notice: Subject to any disclaimer, the term of this patent is extended or adjusted under 35 U.S.C. 154(b) by 280 days.

(21) Appl. No.: 17/830,526

(22) Filed: Jun. 2, 2022

(65) Prior Publication Data

US 2022/0388578 A1 Dec. 8, 2022

Related U.S. Application Data

(60) Provisional application No. 63/196,333, filed on Jun. 3, 2021.

(51) Int. Cl.
*B62D 33/027* (2006.01)
*B60R 7/00* (2006.01)
*B60R 9/06* (2006.01)
*B60R 11/00* (2006.01)

(52) U.S. Cl.
CPC ............ *B62D 33/0273* (2013.01); *B60R 7/00* (2013.01); *B60R 9/06* (2013.01); *B60R 2011/004* (2013.01)

(58) Field of Classification Search
CPC .. B62D 33/0273; B62D 33/03; B62D 33/037; B62D 33/027; B60R 5/04; B60R 5/041; B60R 5/042; B60R 5/045; B60R 7/005; B60R 7/02; B60R 9/06; B60R 9/065; B60R 2011/0036; B60R 2011/004
See application file for complete search history.

(56) References Cited

U.S. PATENT DOCUMENTS

| | | | | |
|---|---|---|---|---|
| 5,498,049 A | * | 3/1996 | Schlachter | B60R 11/06 224/543 |
| 5,702,144 A | * | 12/1997 | Matsuura | B60R 7/046 410/112 |
| 5,876,086 A | * | 3/1999 | Lagrou | B60J 5/101 296/50 |
| 6,007,127 A | * | 12/1999 | Garofalo | B62D 33/0273 296/26.11 |
| 6,073,943 A | | 6/2000 | Serrault | |
| 6,199,930 B1 | * | 3/2001 | Riley | B60R 11/06 224/404 |
| 6,502,885 B1 | * | 1/2003 | Gammon | B60R 7/02 224/511 |
| 6,507,701 B2 | * | 1/2003 | Lake | B60R 9/00 296/26.11 |
| 7,699,373 B2 | * | 4/2010 | Miller | B60P 3/40 296/50 |
| 8,740,279 B1 | * | 6/2014 | McGoff | B62D 33/0273 49/168 |
| 9,132,785 B2 | * | 9/2015 | Roach | B60R 9/065 |
| 10,245,926 B2 | * | 4/2019 | Lewis | B60J 5/105 |
| 10,328,860 B2 | * | 6/2019 | Lewis | B60J 5/105 |

(Continued)

*Primary Examiner* — Gregory A Blankenship
(74) *Attorney, Agent, or Firm* — McDonald Hopkins LLC

(57) ABSTRACT

Provided is a storage system for a split-configuration tailgate. The storage system includes a deployable storage box for placement on one of the first and second doors. In some aspects, the deployable storage box includes a mounting system that permits the storage box to be removed from the split-configuration tailgate.

14 Claims, 20 Drawing Sheets

(56) References Cited

U.S. PATENT DOCUMENTS

| | | | |
|---|---|---|---|
| 10,661,842 B2* | 5/2020 | Povinelli | B60P 1/26 |
| 10,875,463 B2* | 12/2020 | Pulleyblank | B60R 9/065 |
| 10,889,250 B2 | 1/2021 | Flajnik et al. | |
| 10,974,656 B2* | 4/2021 | Keck | B60R 9/065 |
| 11,034,393 B1* | 6/2021 | Ionescu | B62D 33/0273 |
| 11,117,525 B2* | 9/2021 | Koehler | B60R 7/046 |
| 11,358,534 B2* | 6/2022 | Gardner | B60R 9/065 |
| 11,904,951 B2* | 2/2024 | Harmon | B62D 33/0273 |
| 2005/0242138 A1* | 11/2005 | Warganich | B60R 7/02 224/404 |
| 2008/0277956 A1* | 11/2008 | Karuppaswamy | B60R 5/041 296/37.1 |
| 2009/0021035 A1* | 1/2009 | Cheung | B60P 3/40 296/26.11 |
| 2010/0264180 A1* | 10/2010 | Allotey | B60R 11/06 224/404 |
| 2018/0002063 A1* | 1/2018 | Su | B65D 11/26 |
| 2018/0162284 A1* | 6/2018 | Lewis | B60R 7/02 |
| 2020/0180707 A1* | 6/2020 | Johnson | B60P 3/14 |
| 2020/0223368 A1* | 7/2020 | Koehler | B60R 13/0243 |
| 2020/0223370 A1 | 7/2020 | Jayakumar et al. | |
| 2022/0161870 A1* | 5/2022 | Horner | B60J 5/108 |
| 2022/0388578 A1* | 12/2022 | Gill | B62D 33/0273 |

* cited by examiner

SPLIT TAILGATE STORAGE AND ACCESSORY SYSTEM

CROSS-REFERENCE TO RELATED APPLICATIONS

This application claims the benefit of U.S. Provisional Patent Application Ser. No. 63/196,333, filed Jun. 3, 2021, which is hereby incorporated by reference in its entirety for all purposes.

FIELD OF THE INVENTION

The present invention pertains to a storage system for a pickup truck, and in particular to a storage system for use on a pickup truck having a split tailgate.

BACKGROUND OF THE INVENTION

Pickup trucks have functional attributes that permit them to be used for a wide range of applications. This is evident in the market, as pickup trucks are immensely popular for both recreational and work-related transport. Pickup trucks are now available in a range of configurations, but are generally regarded as providing an enclosed cab, for the driver and passengers, and an open rear cargo bed. In general, the cargo bed is bordered by a forward wall, two opposing sidewall sections, and a rear tailgate.

The rear tailgate of a pickup truck has historically been a hinged system that enables the tailgate to be positionable between a generally vertical closed position and a generally horizontal open position that is substantially level with the bed. This conventional configuration of the tailgate has changed in recent years, with the introduction of the multifunctional tailgate system, as detailed for example in U.S. Pat. No. 8,740,279B1 (Multi-functional tailgate for a vehicle; FCA US LLC).

To ensure items placed within the cargo area are protected from being stolen and/or vandalized, and to prevent inadvertent loss due to items falling out of the cargo bed during transport, a variety of cargo bed storage systems have been proposed. A popular configuration for cargo bed storage systems has been the incorporation of storage boxes on one or both of the cargo bed sidewall sections. With the introduction of the multifunctional tailgate system, new opportunities are available for cargo storage solutions that are mountable to the multifuctional tailgate of the cargo bed.

SUMMARY OF THE INVENTION

Provided is a storage system for a split-configuration tailgate having first and second doors. The storage system includes a deployable storage box for placement on one of the first and second doors of the split-configuration tailgate.

BRIEF DESCRIPTION OF THE DRAWINGS

The foregoing and other features and advantages of the invention will be apparent from the following description of embodiments thereof as illustrated in the accompanying drawings. The accompanying drawings, which are incorporated herein and form a part of the specification, further serve to explain the principles of the invention and to enable a person skilled in the pertinent art to make and use the invention. The drawings are not to scale.

DETAILED DESCRIPTION OF EMBODIMENTS OF THE INVENTION

Figure 1:
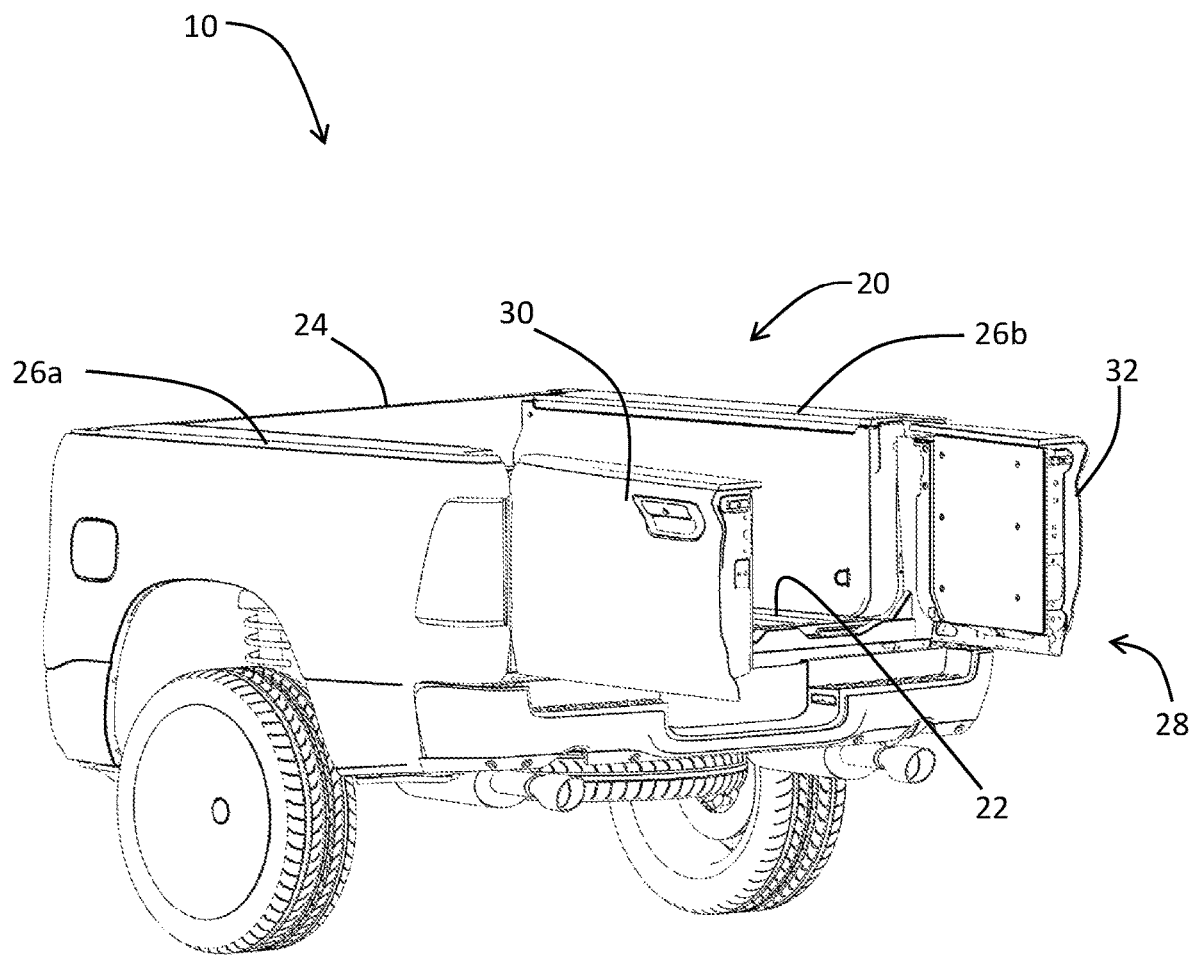
FIG. 1 is a rear perspective view of a cargo bed of a pickup truck, showing a conventional 60/40 split tailgate.

The following detailed description is merely exemplary in nature and is not intended to limit the disclosure or the application and uses of the disclosure. A person skilled in the relevant art will recognize that other configurations and arrangements can be used without departing from the scope of the disclosure. Furthermore, there is no intention to be bound by any expressed or implied theory presented in the preceding technical field, background, brief summary, or the following detailed description.

It should be noted that in the description, terms such as forward, front and derivations of these terms are intended to mean or refer to an orientation directed towards, or a location situated towards, the front of the vehicle or component in question relative to its orientation within a vehicle. Similarly, terms such as rearward, rear and derivations of these terms are intended to mean or refer to an orientation directed towards, or a location situated towards, the back of the vehicle or component in question relative to its orientation within a vehicle. Terms such as up, upper, upward, and derivations of these terms are intended to mean or refer to an orientation that is above or on a top side of the vehicle or component in question relative to its orientation within a vehicle. Terms such as lower, down, downward, and derivations of these terms are intended to mean or refer to an orientation that is below or on a bottom side of the vehicle or component in question relative to its orientation within a vehicle. The term outer, outboard, outside and derivations of these terms is intended to mean or refer to an orientation directed towards, or a location situated outwardly from the side of the vehicle or component in question relative to its orientation within a vehicle. The term inner, inboard, inside and derivations of these terms is intended to mean or refer to an orientation directed towards, or a location situated towards a longitudinal centerline of the vehicle, or component in question relative to its orientation within a vehicle.

In addition, the terms "preferred," "preferably," or "in particular," "for example" or similar terms are used in association with optional features without thereby restricting alternative embodiments. Thus, features which are introduced by these terms are optional features, and there is no intention to restrict the scope of protection of the claims and, in particular, the independent claims by means of these features. Thus, as a person skilled in the art will recognize, the invention can also be implemented using different embodiments. In a similar way, features which are introduced by "in one embodiment of the invention" or by "in one illustrative embodiment of the invention" are understood to be optional features without any intention thereby to restrict alternative embodiments or the scope of protection of the independent claims. Moreover, these introductory expressions are not intended to affect all the ways of combining the features introduced thereby with other features, whether optional or non-optional features.

Pickup Truck Rear Configuration Overview

Referring now to FIG. 1, shown is a rear portion of a vehicle or pickup truck 10 having a cargo bed 20. The cargo bed 20 includes a floor 22, an upstanding forward wall 24 immediately adjacent and rearward of a cab (not shown), and two upstanding opposing sidewall sections 26a, 26b. Opposite to the forward wall 24 towards the rear of the cargo bed 20 is situated a tailgate 28. The tailgate 28 includes a hinge assembly (not shown) permitting the tailgate 28 to operate as a multifunction tailgate, for example as disclosed in U.S. Pat. No. 8,740,279, the contents of which are incorporated by reference. In particular, the tailgate 28 is configured with at least one door that can be opened to swing out about a vertical axis. As shown, the tailgate 28 includes a first door 30 and a second door 32, each of which can be independently opened to swing out about a respective vertical axis.

Figure 2:
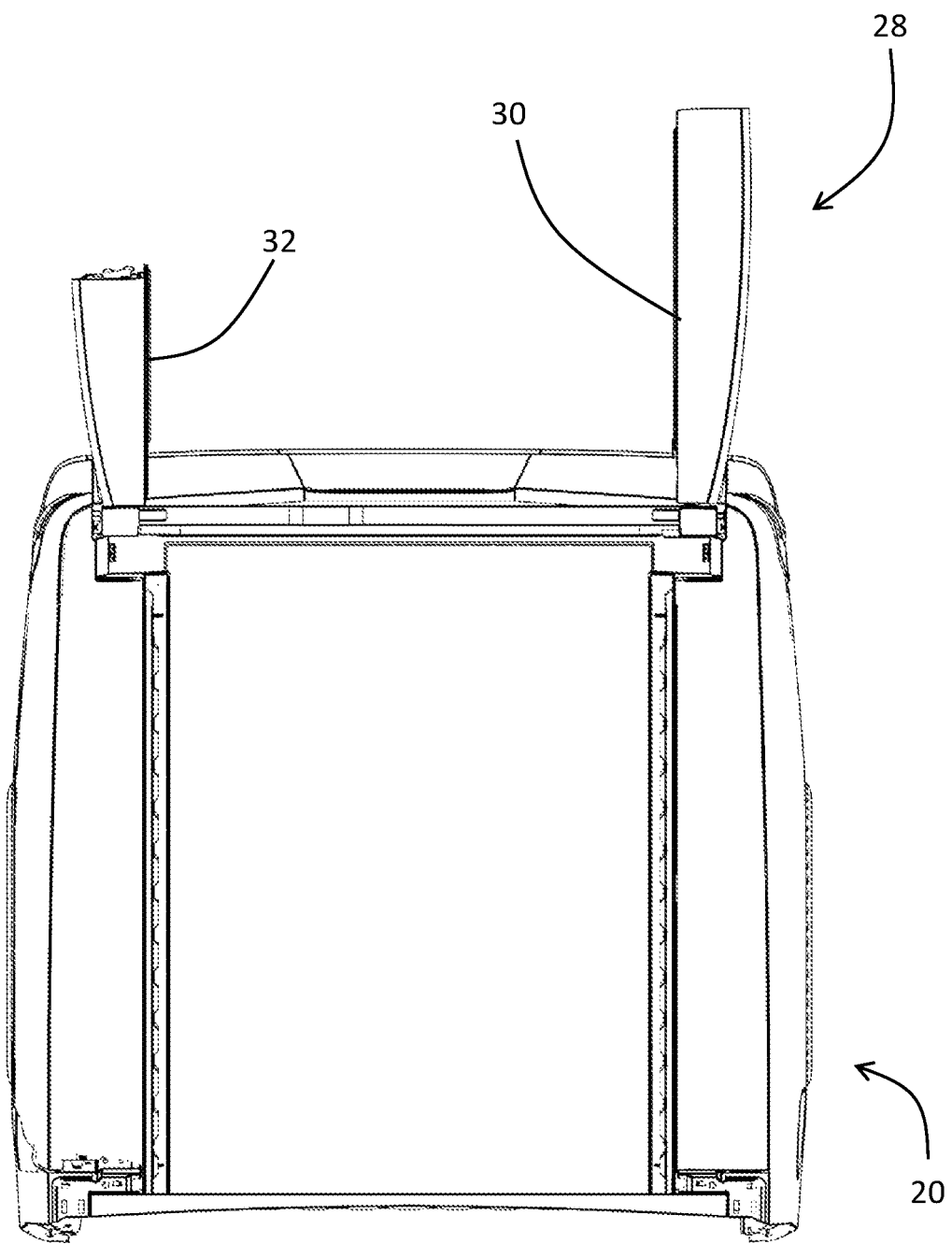
FIG. 2 is a top view of the cargo bed according to FIG. 1.

With reference to FIG. 2, the cargo bed 20 is shown from a top-side view, and it is evident from this perspective that the tailgate 28, in particular the first and second doors 30, 32 are arranged in a 60/40 split configuration. It will be appreciated, however, that the first and second doors 30, 32 may be provided in various split configurations, such as 50/50, 65/35 or 70/30.

Figure 3:
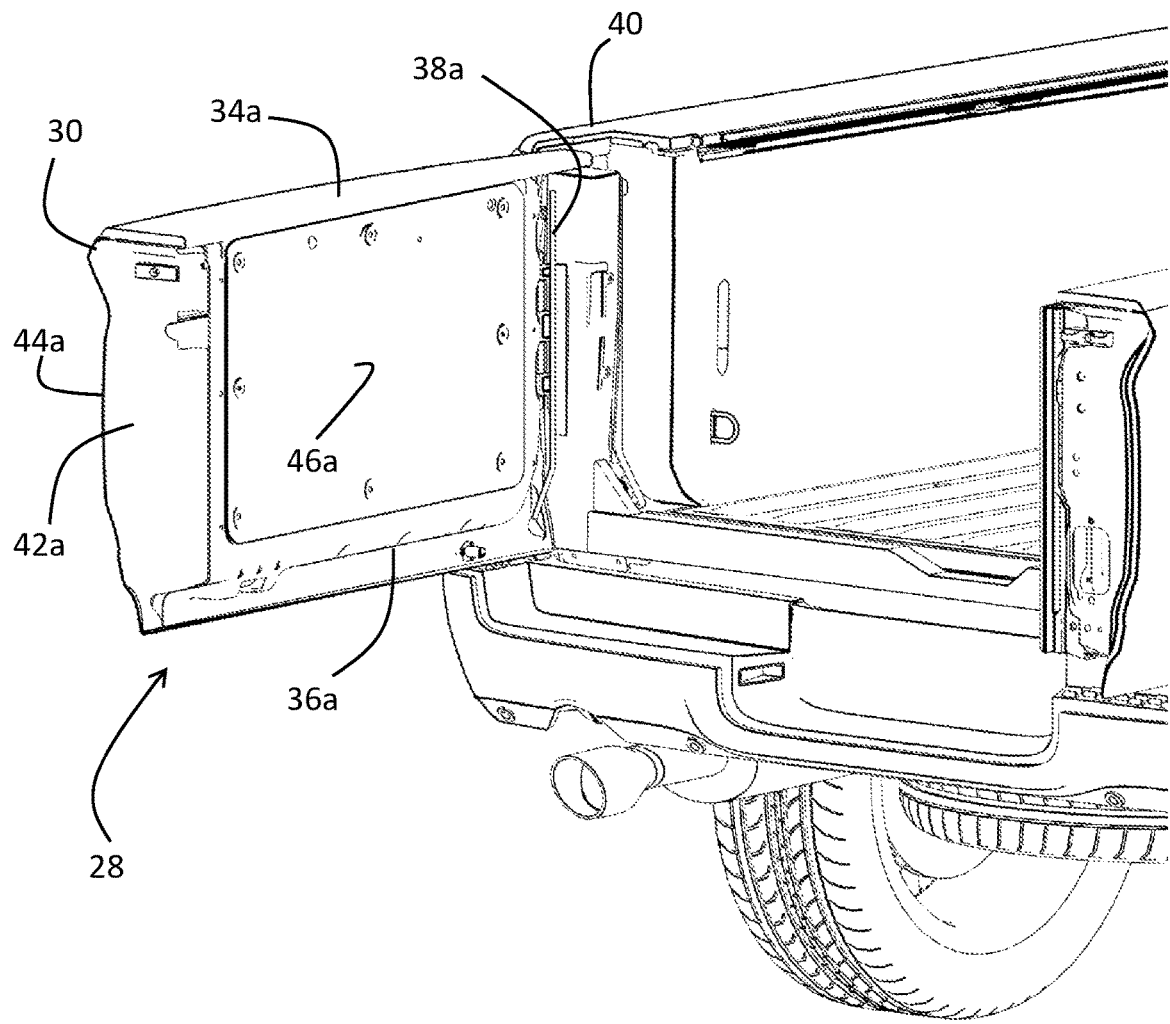
FIG. 3 is a close-up perspective view of the first door of the split tailgate of FIG. 1.

With reference to FIG. 3, a close-up of the first door 30 of the tailgate 28 is shown to detail aspects thereof. In general, the first door 30 includes a top-side 34a, an opposing bottom-side 36a, a hinged side 38a configured for hinged attachment to a D-pillar 40, and an opposing closure side 42a, configured to mate and engage with the second door 32 of the tailgate 28. The first door also includes an outer panel 44a that faces the exterior of the vehicle, and an inner panel 46a that faces the interior area of the cargo bed when the first door 30 is in a closed position. It will be appreciated that the above discussion of the first door 30 is only general in nature, as the various features permitting for the operation of the first door 30 and broader tailgate 28 are known, for example as disclosed in U.S. Pat. No. 8,740,279.

Figure 4:
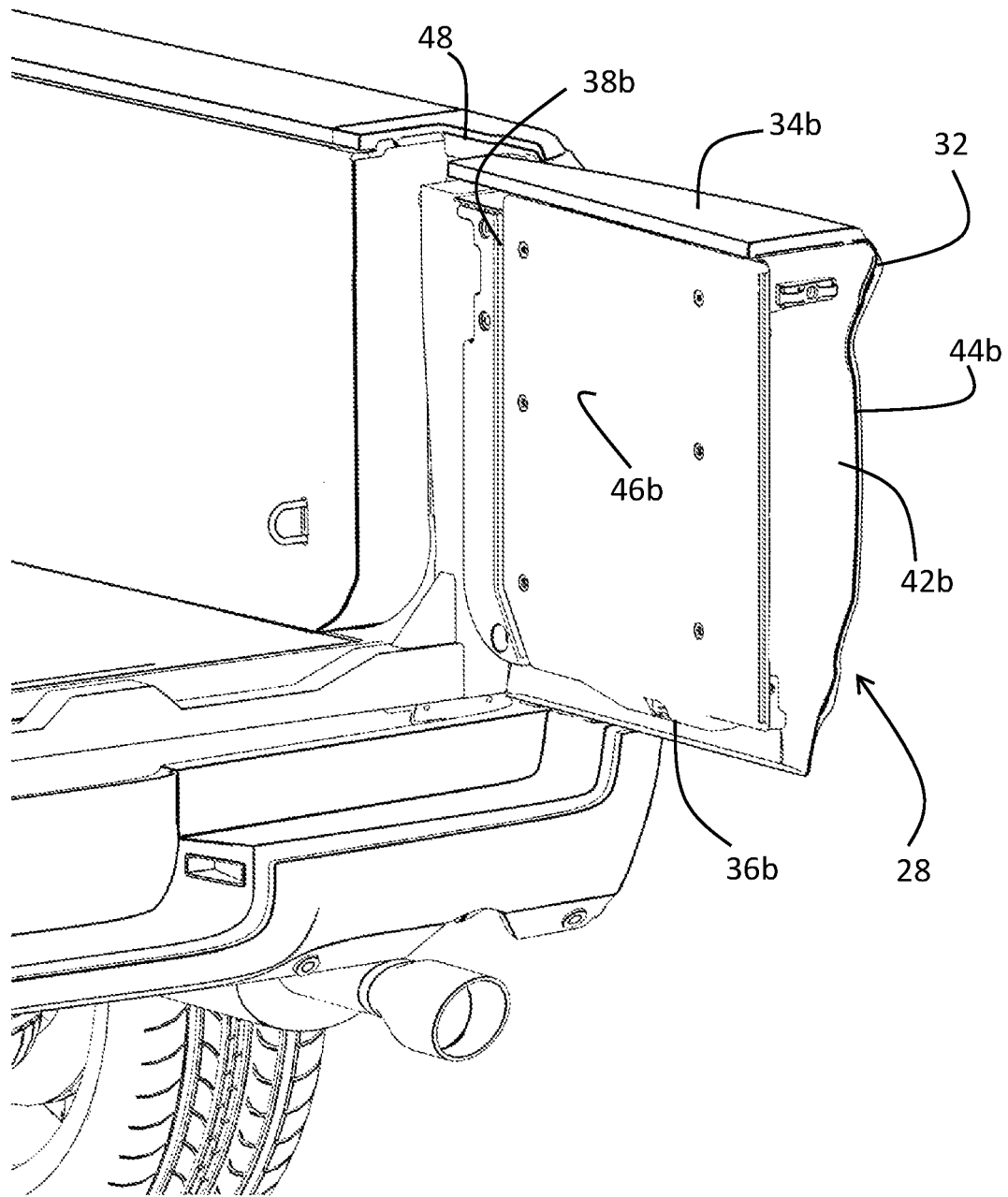
FIG. 4 is a close-up perspective view of the second door of the split tailgate of FIG. 1.

With reference to FIG. 4, a close-up of the second door 32 of the tailgate 28 is shown to detail aspects thereof. In general, the second door 32 includes a top-side 34b, an opposing bottom-side 36b, a hinged side 38b configured for hinged attachment to a D-pillar 48, and an opposing closure side 42b, configured to mate and engage with the first door 30 of the tailgate 28. The second door also includes an outer panel 44b that faces the exterior of the vehicle, and an inner panel 46b that faces the interior area of the cargo bed when the second door 32 is in a closed position. The inner panel 46b as shown is generic in form. As will be discussed in greater detail below, the inner panel 46b may include additional functional features, such as elements forming part of a universal mounting system. It will be appreciated that the above discussion of the second door 32 is only general in nature, as the various features permitting for the operation of the second door 32 and broader tailgate 28 are known, for example as disclosed in U.S. Pat. No. 8,740,279.

Deployable Storage Box—60-Side

Figure 5:
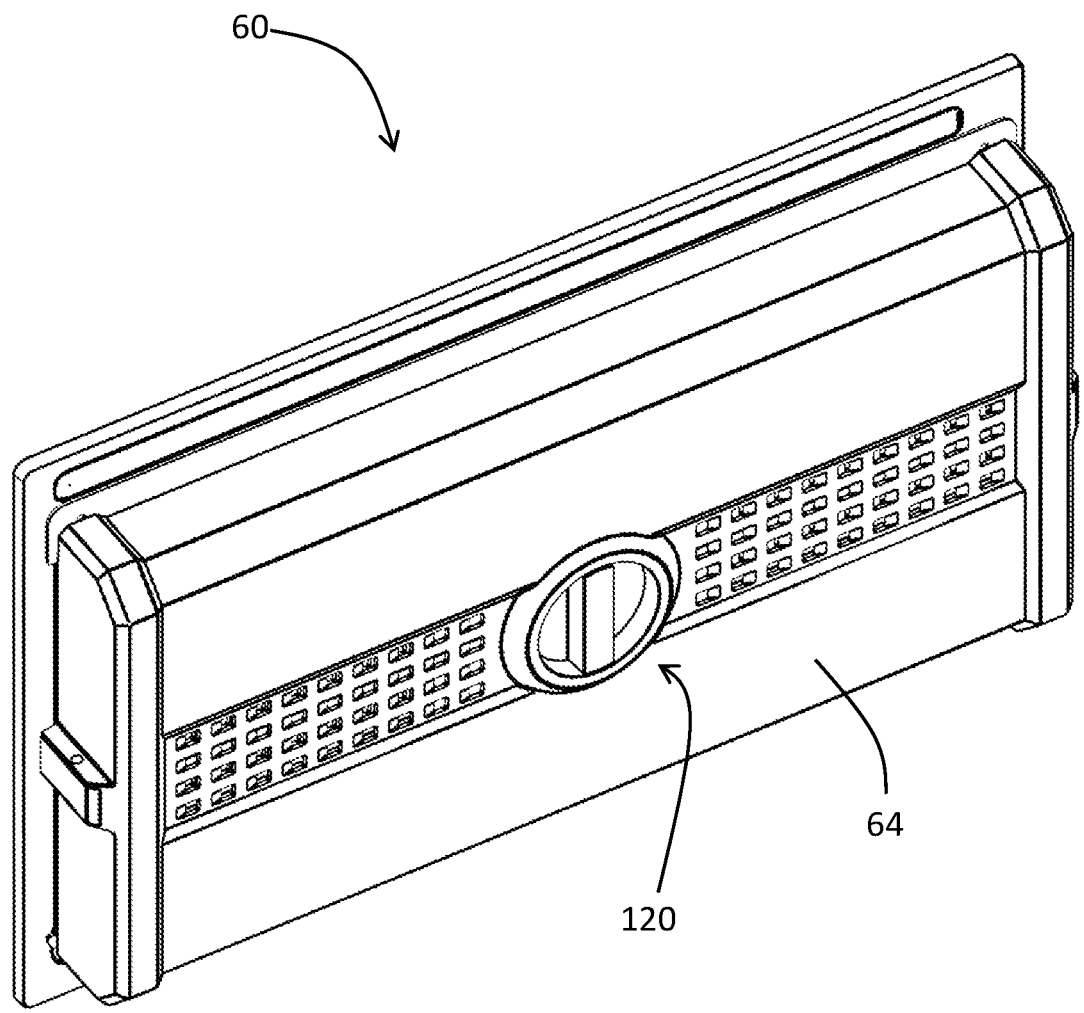
FIG. 5 is a front perspective view of a storage box shown in the fully closed position.

With reference now to FIG. 5, shown in isolation is a deployable storage box 60 configured to be mounted upon the inner panel 46 of one of the first and second doors 30, 32. For the embodiment described herein, the storage box 60 is configured to be mounted upon the inner panel 46a of the first door 30. As shown in FIG. 5, the storage box 60 is shown in a first position, herein referred to as the stowed (closed) position.

Figure 6:
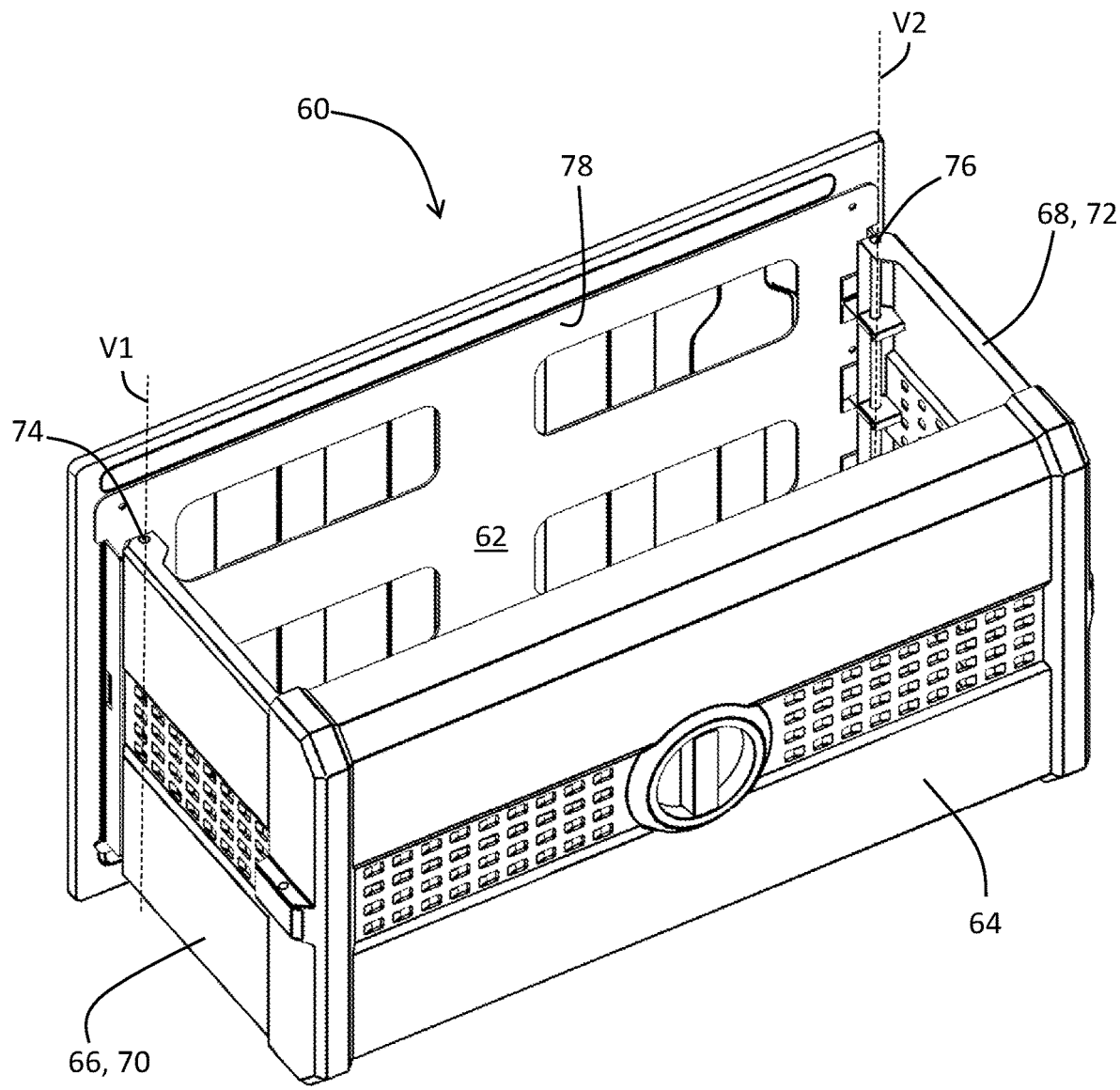
FIG. 6 is a front perspective view of the storage box of FIG. 5, shown in the fully opened position.

With reference to FIG. 6, the storage box 60 is shown in a second position, herein referred to as the deployed (open) position. In this state, the storage box 60 includes a cargo containment space 62 that is demarcated from the remainder of the cargo bed, permitting for greater accessibility and control over content contained therein.

Figure 7:
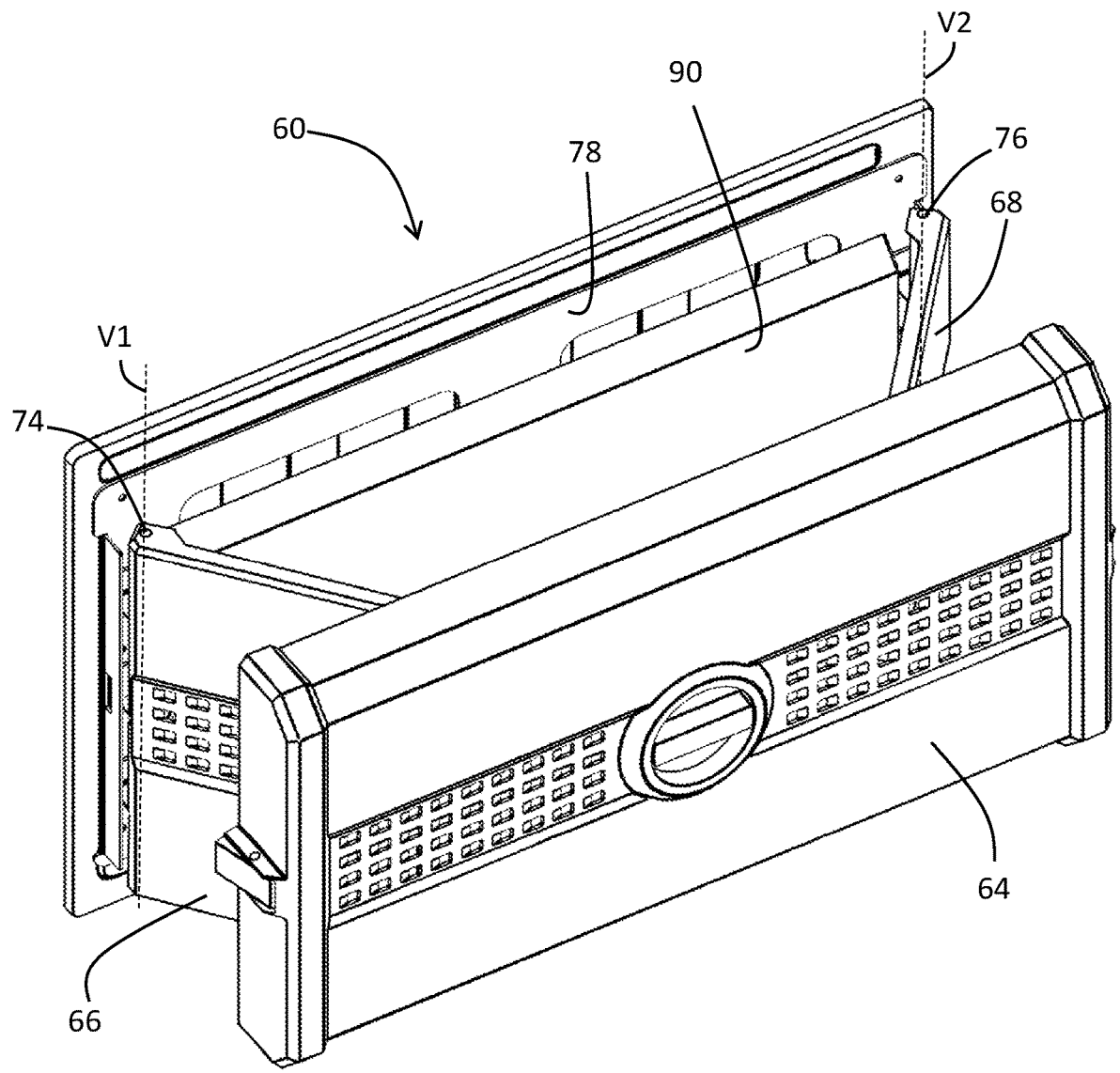
FIG. 7 is a front perspective view of the storage box of FIG. 5, shown at an intermediate point between the fully opened and fully closed positions.

With reference to FIG. 7, the storage box 60 is shown at an intermediate point in its transition between the stowed and deployed positions.

Figure 8:
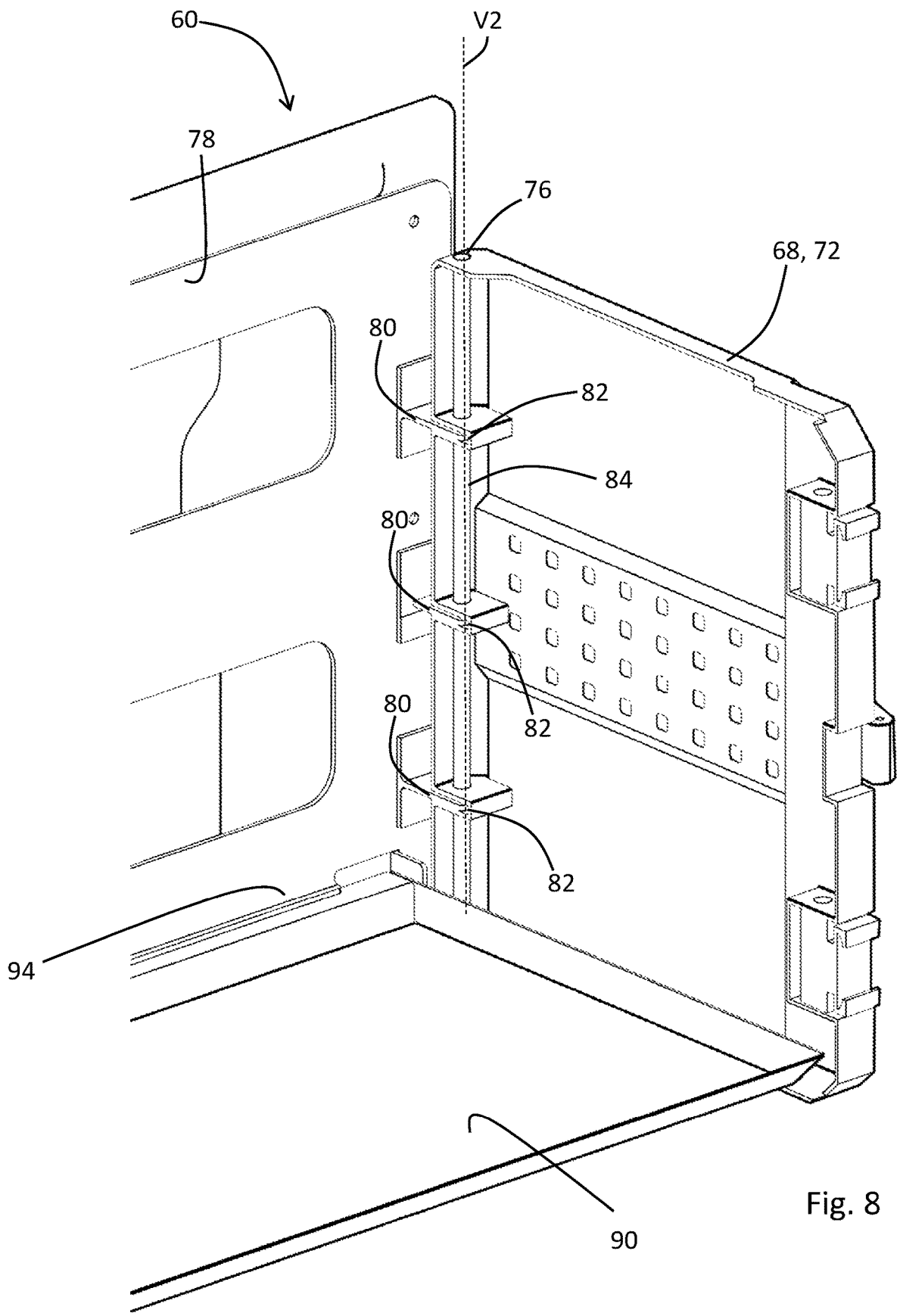
FIG. 8 is a front perspective view of a portion of the storage box of FIG. 5, with certain portions hidden to better visualize aspects of the side panel hinge.

The storage box 60 includes a forward wall panel 64 that moves between the stowed position as shown in FIG. 5, and the deployed position as shown in FIG. 7. This displacement allows for a first side panel 66 and a second side panel 68 to pivot about respective vertical axes V1, V2 to form respective first and second side walls 70, 72 of the deployed storage box 60. The vertical axes V1, V2 are defined by respective hinges 74, 76 that attach the first and second side panels 66, 68 to a base member 78. With reference to FIG. 8, portions of the storage box 60 are removed to provide greater clarity on the hinge 76 for the second side panel 68. As shown, the hinge 76 includes at least one hinge tab 80 supported upon the base member 78, each hinge tab 80 being received within a respective hinge pocket 82 formed as part of the side wall (the second side wall 72 in the view shown). A hinge pin 84 is used to retain the hinge 76 in an assembled state. The hinge tab 80 remains stationary, while the hinge pocket 82 is pivotable about the hinge tab 80, therein permitting the second side panel 68 to pivot about the vertical axis V2. As shown, each hinge 76 includes three cooperating pairs of hinge tabs and pockets 80, 82. The hinge 74 for the first side panel 66 is similarly configured.

Figure 9:
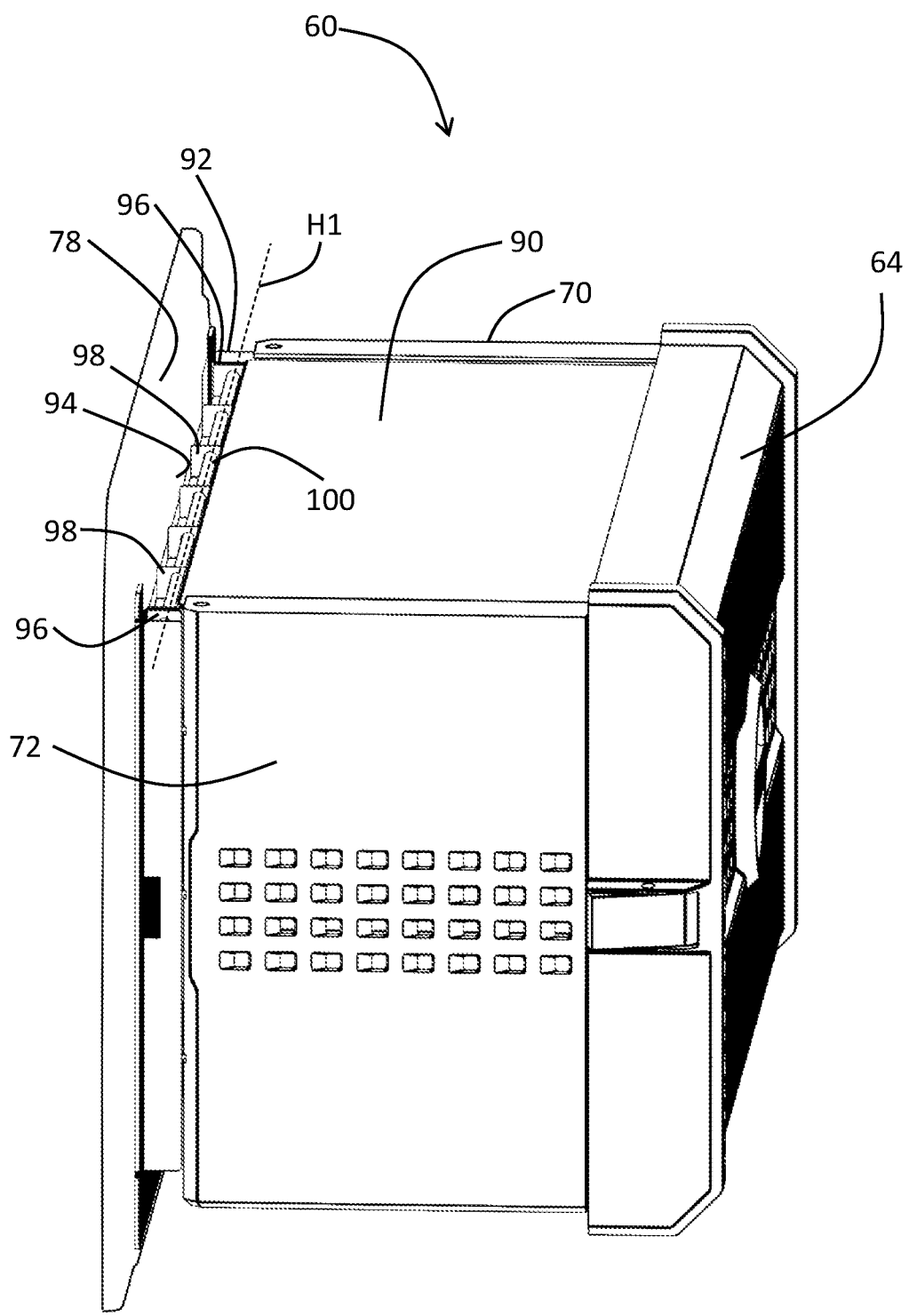
FIG. 9 is a perspective view of the bottom of the storage box of FIG. 5.

The base member 78 is generally defined as a plate structure and serves to enable attachment of the storage box 60 upon the inner panel 46, for example using suitable fasteners (not shown). The displacement of the forward wall panel 64 also permits for the deployment of a floor panel 90. In the stowed state, the floor panel 90 is rotated upright, generally against the base member 78. This arrangement of the floor panel 90 is shown in FIG. 7. Upon complete displacement of the forward wall panel 64, the floor panel 90 pivots about a respective horizontal axis H1 to the deployed state. The horizontal axis is defined by a hinge 92 connecting the floor panel 90 to a lower edge 94 of the base member 78. With reference to FIG. 9, an underside view of the storage box 60 is shown, to provide greater clarity on the arrangement of the floor panel 90. As shown, the hinge 92 includes a least one hinge bracket 96 supported upon the base member 78, at each side along the horizontal axis H1. The floor panel 90 includes a plurality of hinge tabs 98 that similarly align to the horizontal axis H1 in such a way as to be captured by a hinge pin 100. The hinge brackets 96 remain stationary, while the hinge tabs 98 are pivotable about the hinge brackets 96, therein permitting the floor panel 90 to pivot about the horizontal axis H1. In this deployed state, the periphery of the floor panel 90 is supported upon the first and second side walls 70, 72 as well as the forward wall panel 64, to prevent overextension and damage to the storage box structure.

Figure 10:
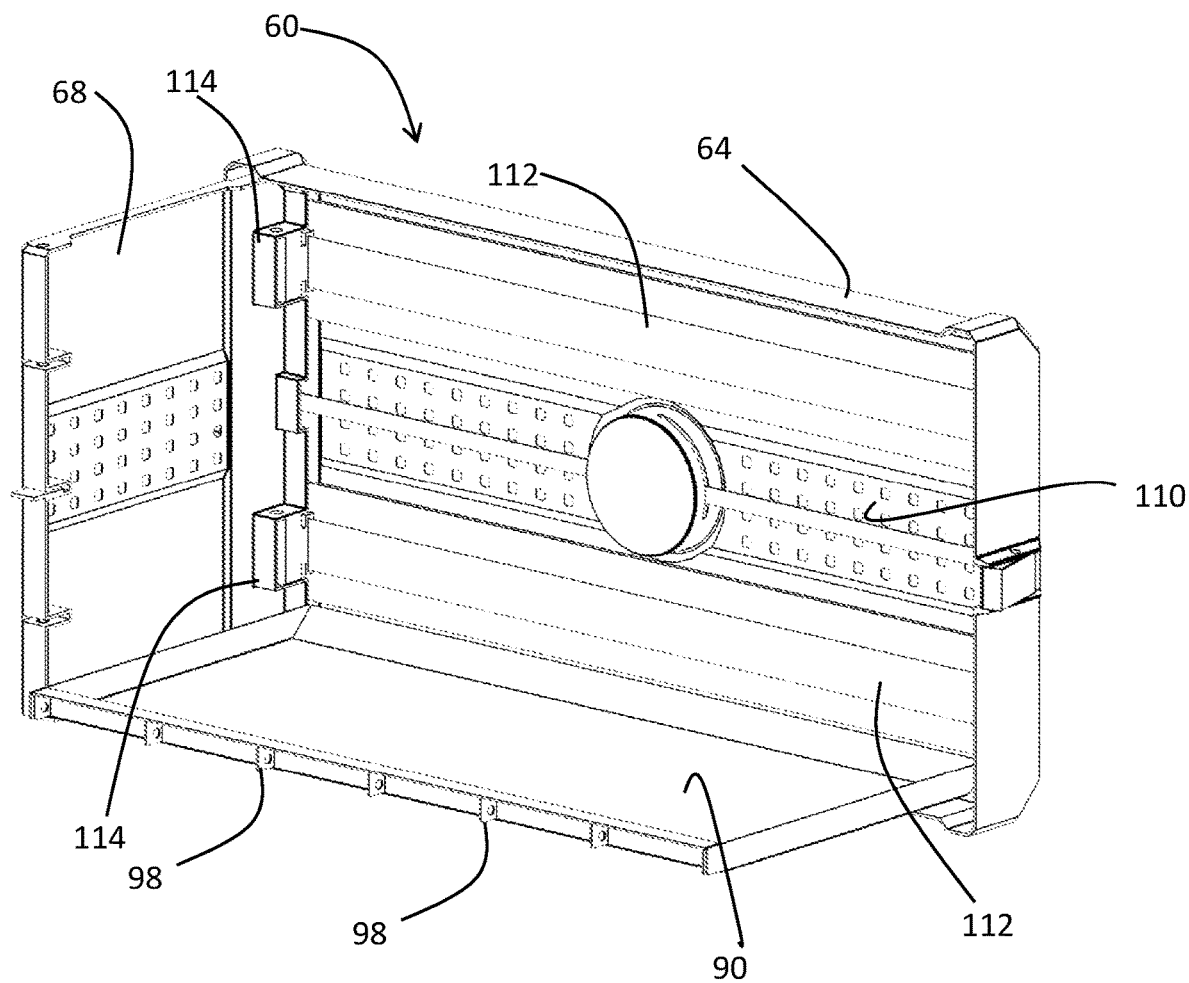
FIG. 10 is a rear perspective view of storage box of FIG. 5, with certain portions hidden to better visualize aspects of the slider/rail system.

With reference now to FIG. 10, portions of the storage box are removed to provide greater clarity on aspects that facilitate the attachment and displacement of the forward wall panel 64. As shown, the inside surface 110 of the forward wall panel 64 supports at least one rail 112 that cooperates with a respective slider 114 on each of the first and second side panels 66, 68 (only the second side panel 68 is shown). In the embodiment shown, two rail/slider assemblies are provided. It is the engagement of the sliders 114 upon the rails 112 that permit attachment of the forward wall panel 64 to the first and second side panels 66, 68, while permitting its displacement required to deploy/stow the storage box 60.

Figure 11:
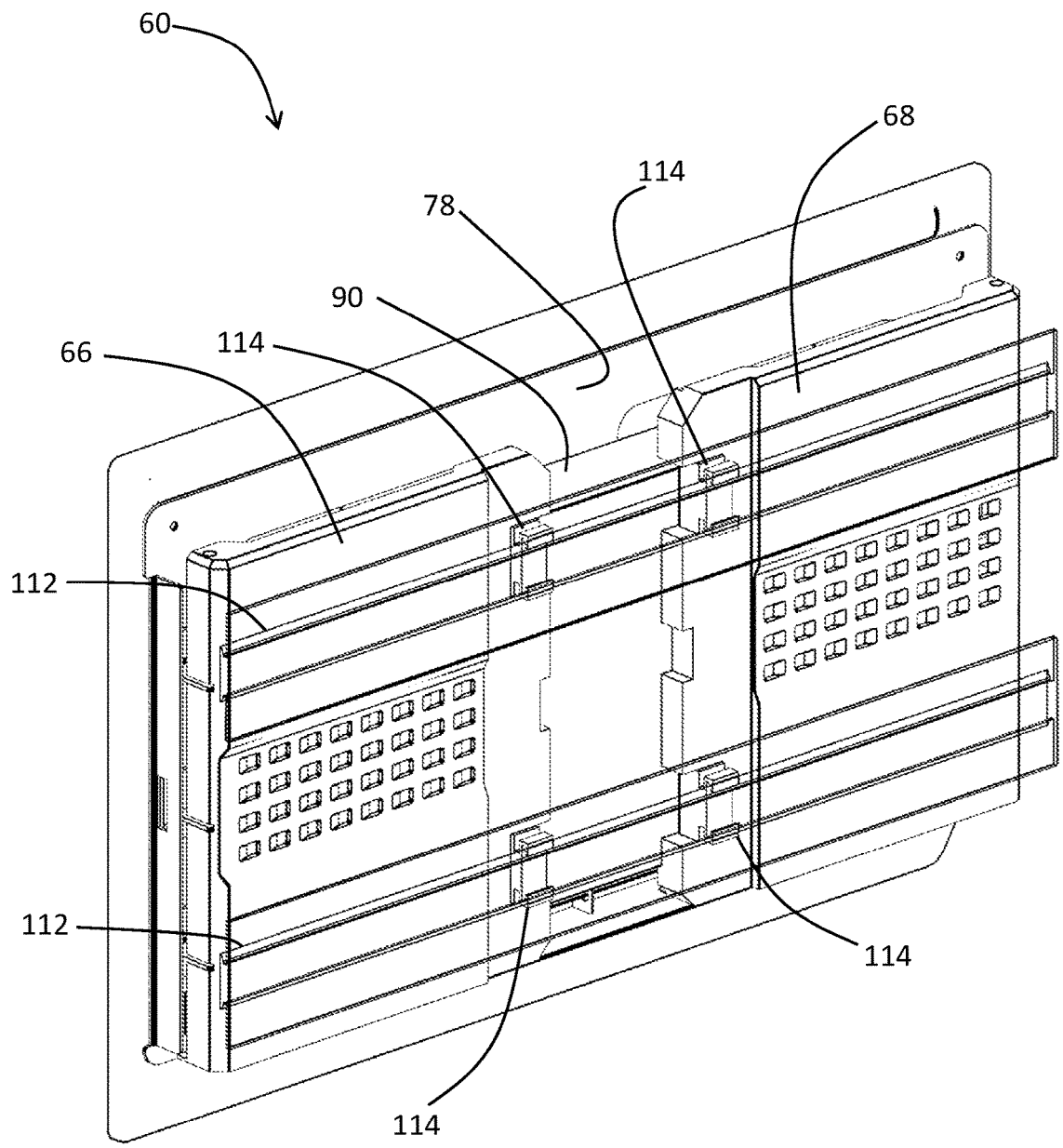
FIG. 11 is a front perspective view of storage box of FIG. 5, with certain portions hidden to better visualize aspects of the slider/rail system, the storage box shown in the fully closed position.
Figure 12:
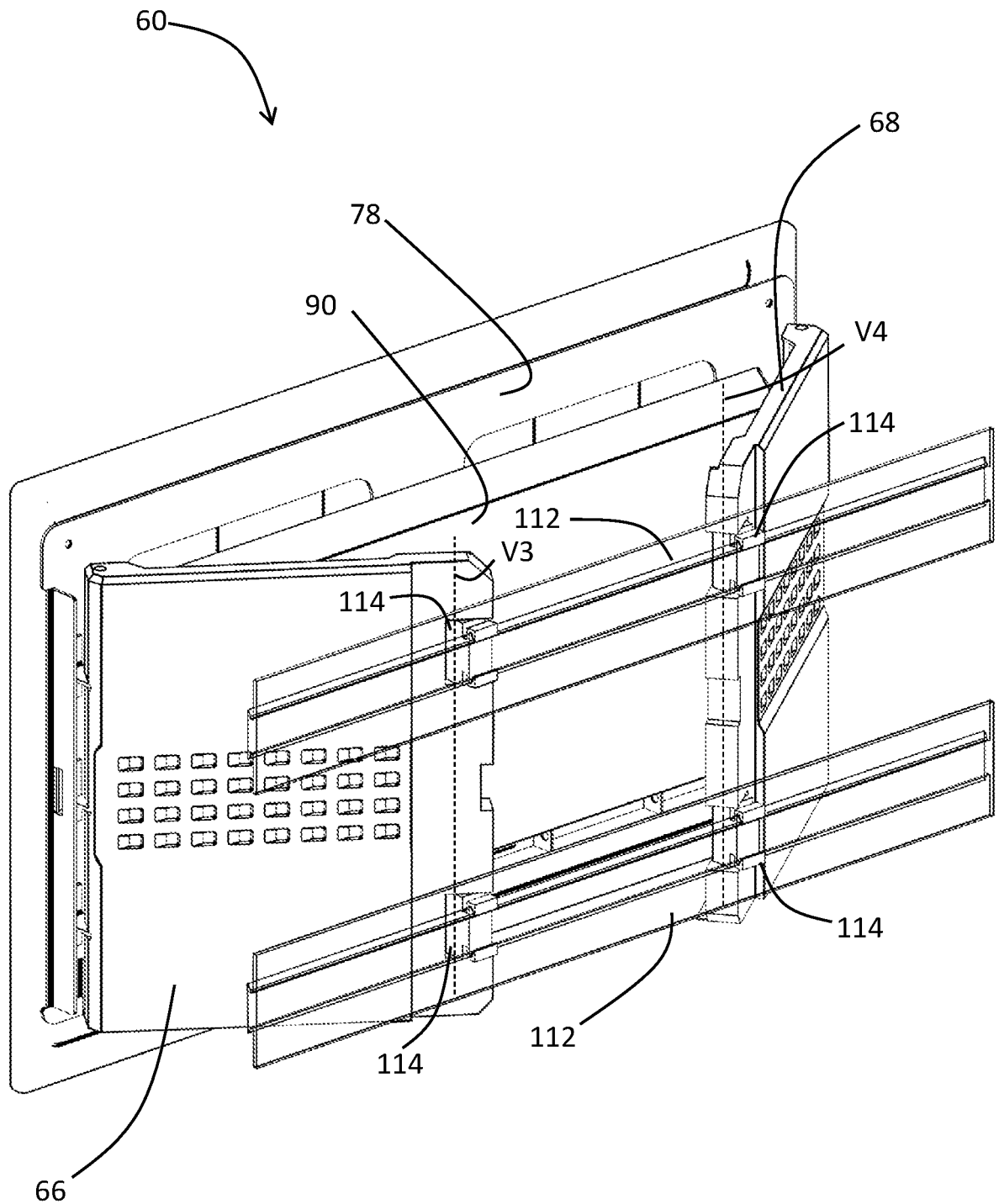
FIG. 12 is a front perspective view of storage box of FIG. 5, with certain portions hidden to better visualize aspects of the slider/rail system, the storage box shown in the intermediate position.
Figure 13:
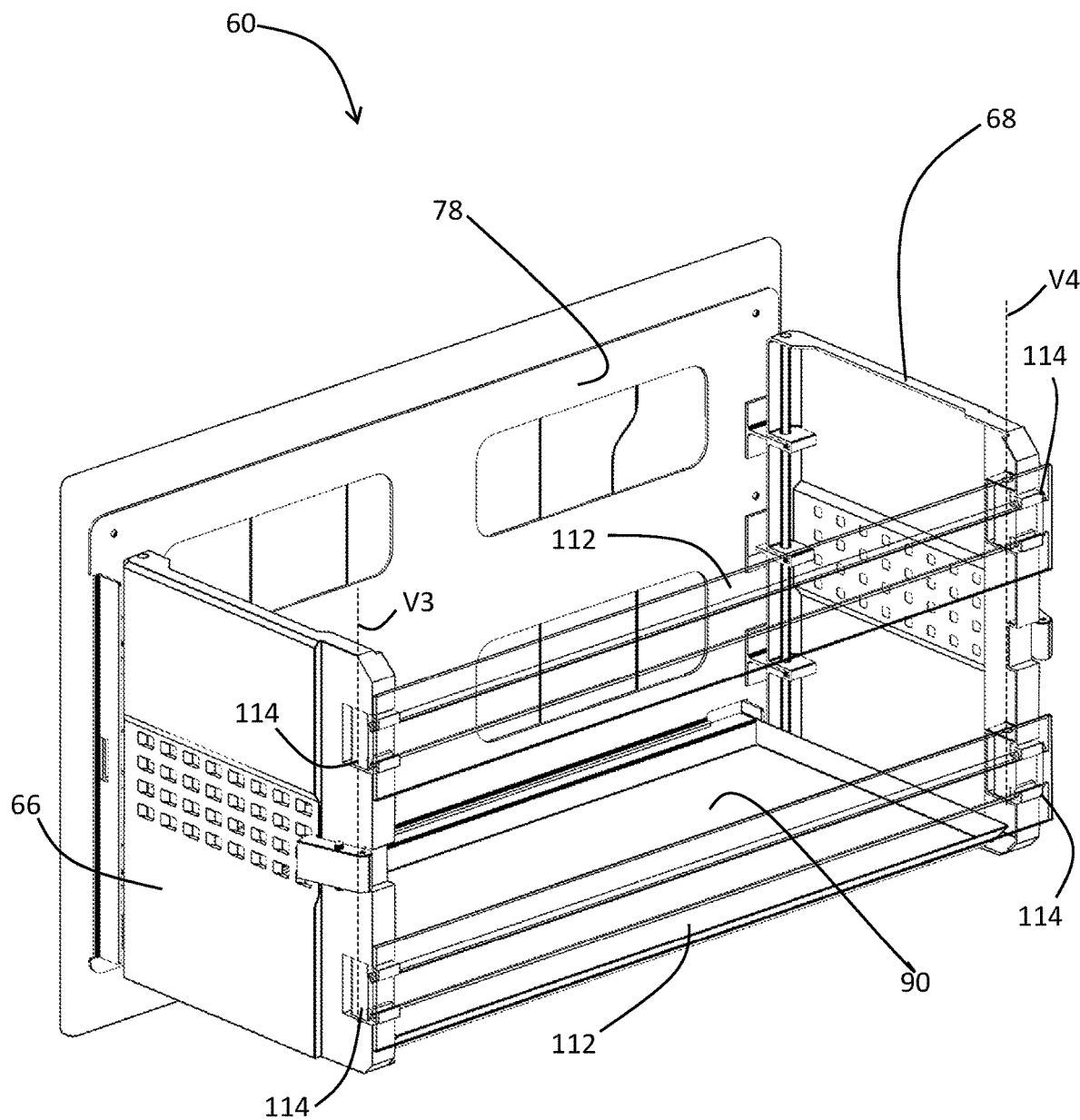
FIG. 13 is a front perspective view of storage box of FIG. 5, with certain portions hidden to better visualize aspects of the slider/rail system, the storage box shown in the fully opened position.

With reference now to FIGS. 11, 12 and 13, the storage box 60 is shown at various stages of deployment, with the forward wall panel 64 hidden to provide greater clarity on the actions of the rail/slider mechanism. In FIG. 11, the storage box 60 is shown in the stowed position; the floor panel 90 is rotated upright, generally against the base member 78, while the first and second side panels 66, 68 are similarly rotated, against the upright floor panel 90. The sliders 114 are engaged upon the respective rails 112 (shown as transparent to facilitate explanation) and are positioned at generally centralized locations thereof. In FIG. 13, the first and second side panels 66, 68, as well as the floor panel 90 are rotated into their deployed positions. The sliders 114, still engaged upon the respective rails 112 are positioned at generally lateral locations upon the rail 112. It is evident that in both the stowed and deployed positions, as well as any intermediate point therebetween, the sliders 114 remained engaged upon the rails 112, and are thereupon slidable during the displacement of the forward wall panel 64. To facilitate this action, and as shown in FIGS. 11, 12 and 13, the sliders 114 are permitted to rotate or pivot about a vertical axis V3, V4 relative to the respective side panels 66, 68 during their movement upon the rail 112. With reference to FIG. 11, the sliders 114 are shown in a position that is rotated approximately 90° relative to the position of the same sliders 114 in the deployed state, shown in FIG. 13. In this manner, the angular alignment of the sliders 114 remains constant relative to the rails 112, while permitting rotation of the side panels 66, 68 during the displacement of the forward wall panel 64.

Figure 14:
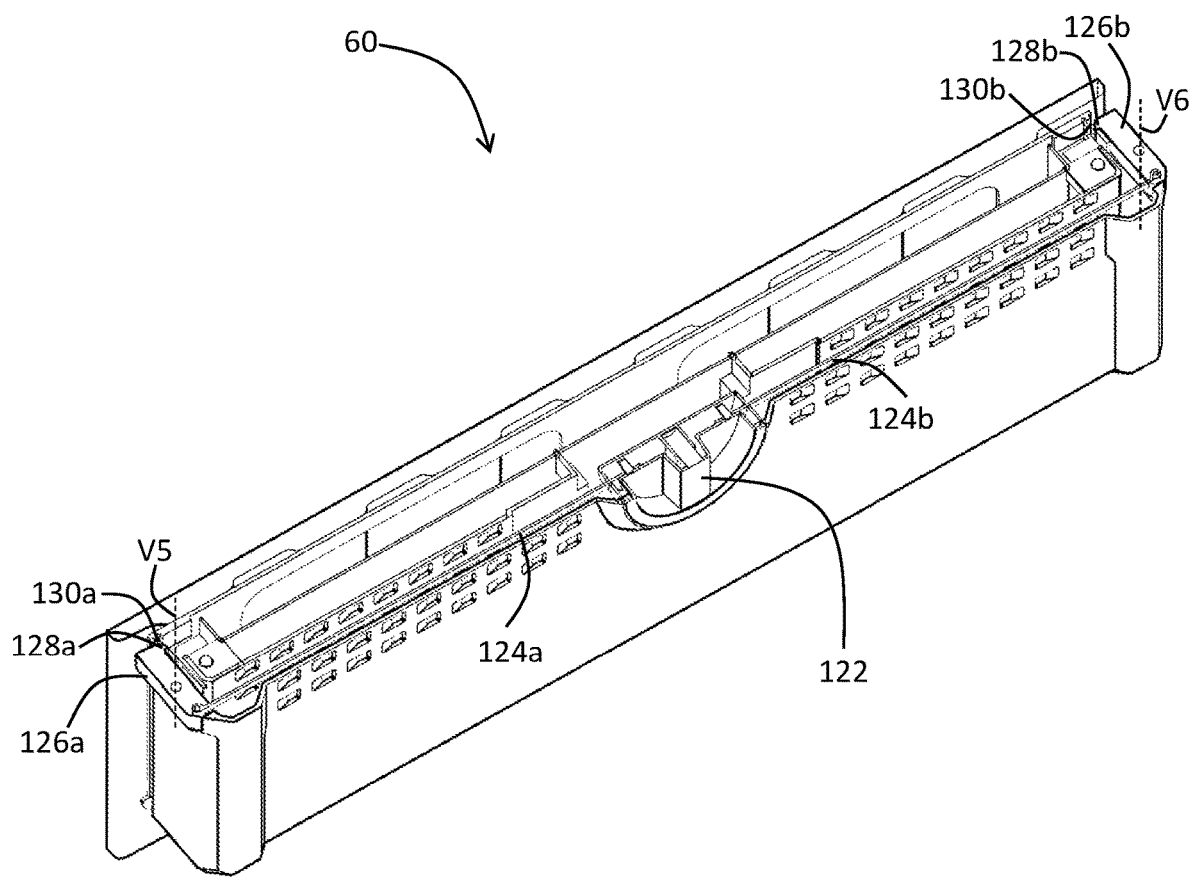
FIG. 14 is a sectional front perspective view of the storage box of FIG. 5, showing aspects of the locking mechanism, the locking mechanism shown in the locked position.
Figure 15:
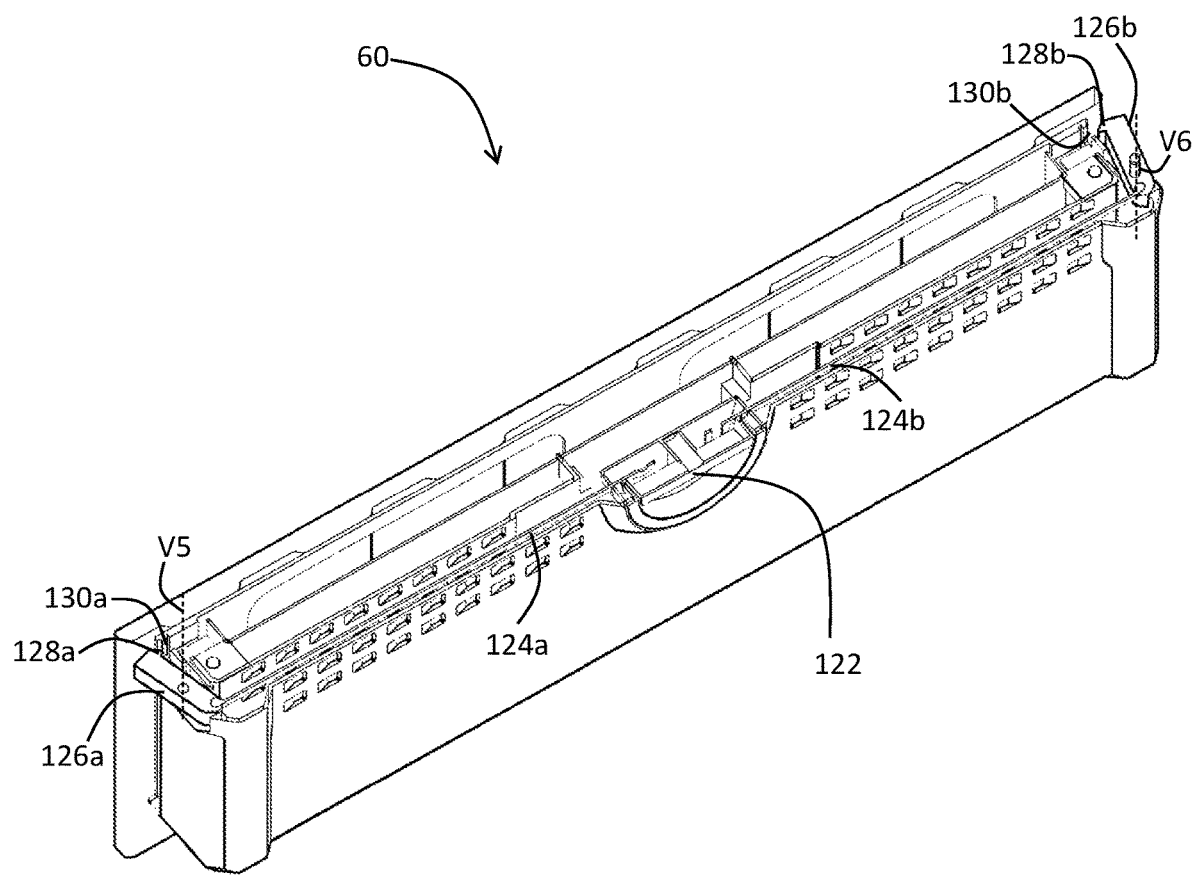
FIG. 15 is a sectional front perspective view of the storage box of FIG. 5, showing aspects of the locking mechanism, the locking mechanism shown in the unlocked position.
Figure 16:
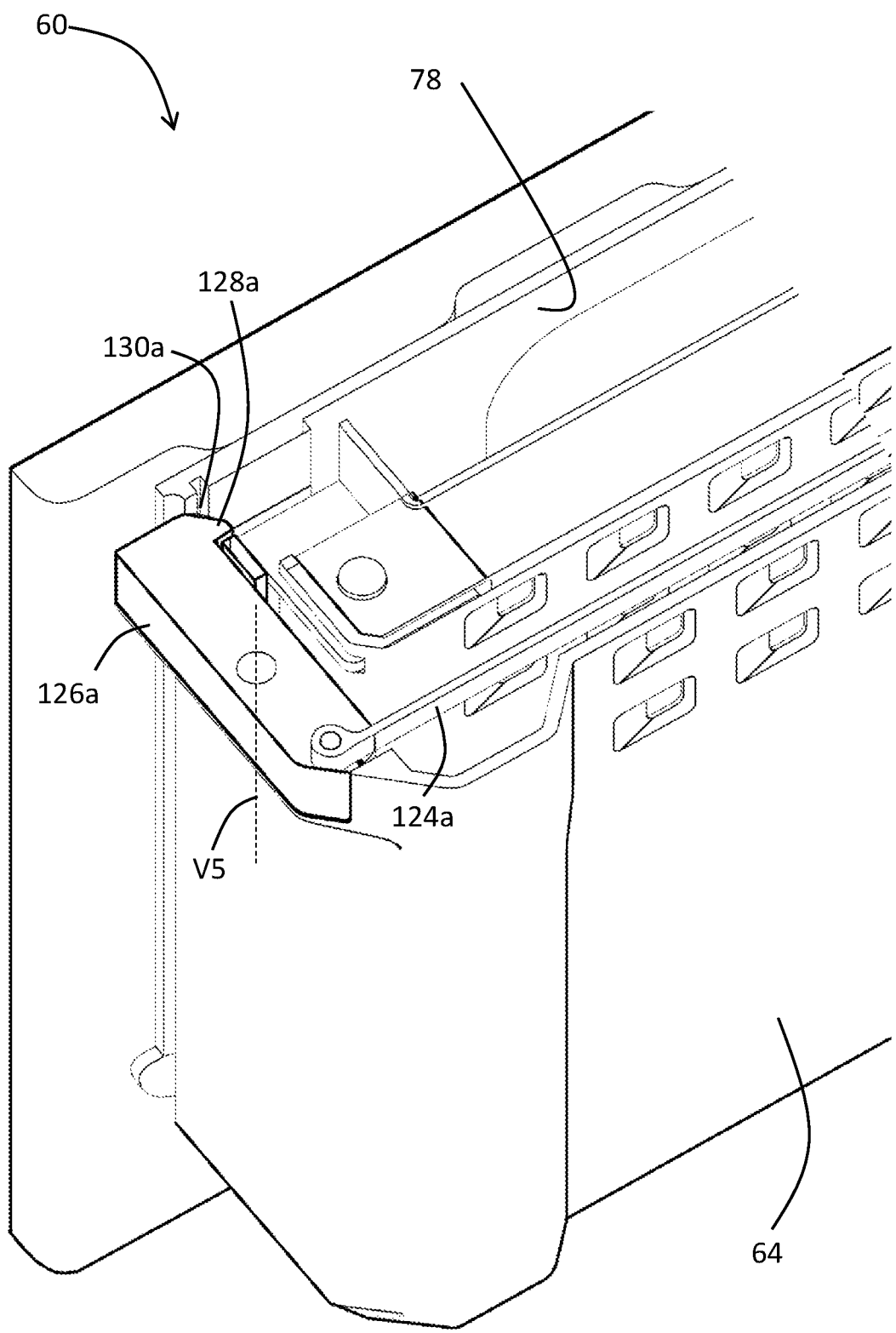
FIG. 16 is a close up of the sectional front perspective view of FIG. 14, detailing aspects of the lock tab and lock aperture.

Referring back to FIG. 5, the storage box 60 is shown to include a locking mechanism 120 to enable the storage box 60 to be secured in the stowed position. With reference to FIGS. 14 and 15, the locking mechanism is shown to include a rotatable actuator handle 122, first and second lock linkages 124a, 124b and respective first and second locking elements 126a, 126b. The actuator handle 122 and linkages 124a, 124b are operable to pivot the respective first and second locking elements 126a, 126b about vertical axes V5, V6. In the locked position shown in FIG. 14, the first and second locking elements 126a, 126b are rotated into a position that has a lock tab 128a, 128b engaged a respective lock aperture 130a, 130b on the base member 78. As the locking mechanism is mounted upon the forward wall panel 64, the engagement of the lock tabs 128a, 128b within the respective lock apertures 130a, 130b prevents the displacement of the forward wall panel 64 from the stowed position to the deployed position. In the unlocked position shown in FIG. 15, the first and second locking elements 126a, 126b are rotated into a position that has the lock tabs 128a, 128b disengaged from the respective lock apertures 130a, 130b therein permitting the forward wall panel 64 to displace from the stowed position to the deployed position. Aspects of the engagement between the lock tab 128 and lock aperture 130 is shown in greater detail in the closeup view of FIG. 16, shown in the locked position.

It will be appreciated that the locking mechanism detailed above is exemplary, and that a variety of locking mechanisms may be implemented. For instance, the storage box 60 may be locked in the stowed position using one or more simple latches that temporarily connect the forward wall panel 64 to the base member 78 when in the stowed position.

Removeable Rolling Cargo Box—40-Side

Figure 17:
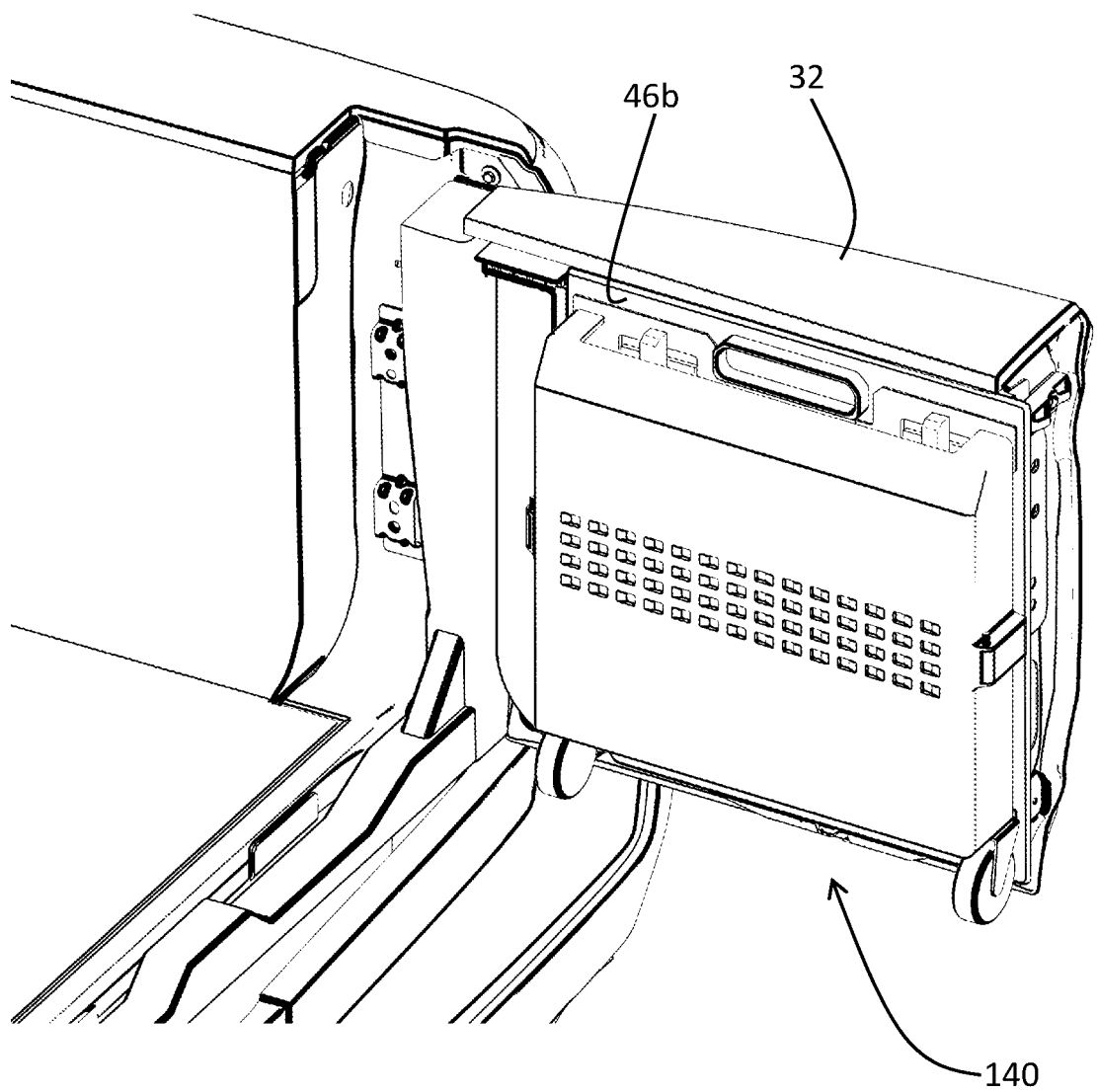
FIG. 17 is a front perspective view of a rolling cargo box shown in the fully closed position.

With reference now to FIG. 17, shown is a removeable rolling cargo box 140 mounted upon the inner panel 46b of the second door 32. The rolling cargo box 140 is configured to be collapsible. Collapsible rolling cargo boxes are known and are available in a variety of configurations. It is not the intention of the applicant to limit the invention to any one particular configuration of collapsible rolling cargo box. The cargo box shown herein is merely exemplary for the purposes of detailing a universal mounting system suitable for use on the inner panel 46 of either first or second door 30, 32 of the tailgate 28. In the drawings, the mounting system is shown with respect to the inner panel 46b of the second door 32. While exemplified in one form, in an alternative embodiment, the rolling cargo box 140 may be configured similar to the collapsible rolling container detailed in U.S. Pat. No. 6,073,943A, the details of which are incorporated by reference. In further alternative embodiments, the manner by which the cargo box folds may be similar to that detailed in Applicant's U.S. Pat. No. 10,889,250 (the details of which are incorporated by reference) or Applicant's pending US Patent Application No. 20200223370 (the details of which are incorporated by reference).

Figure 18:
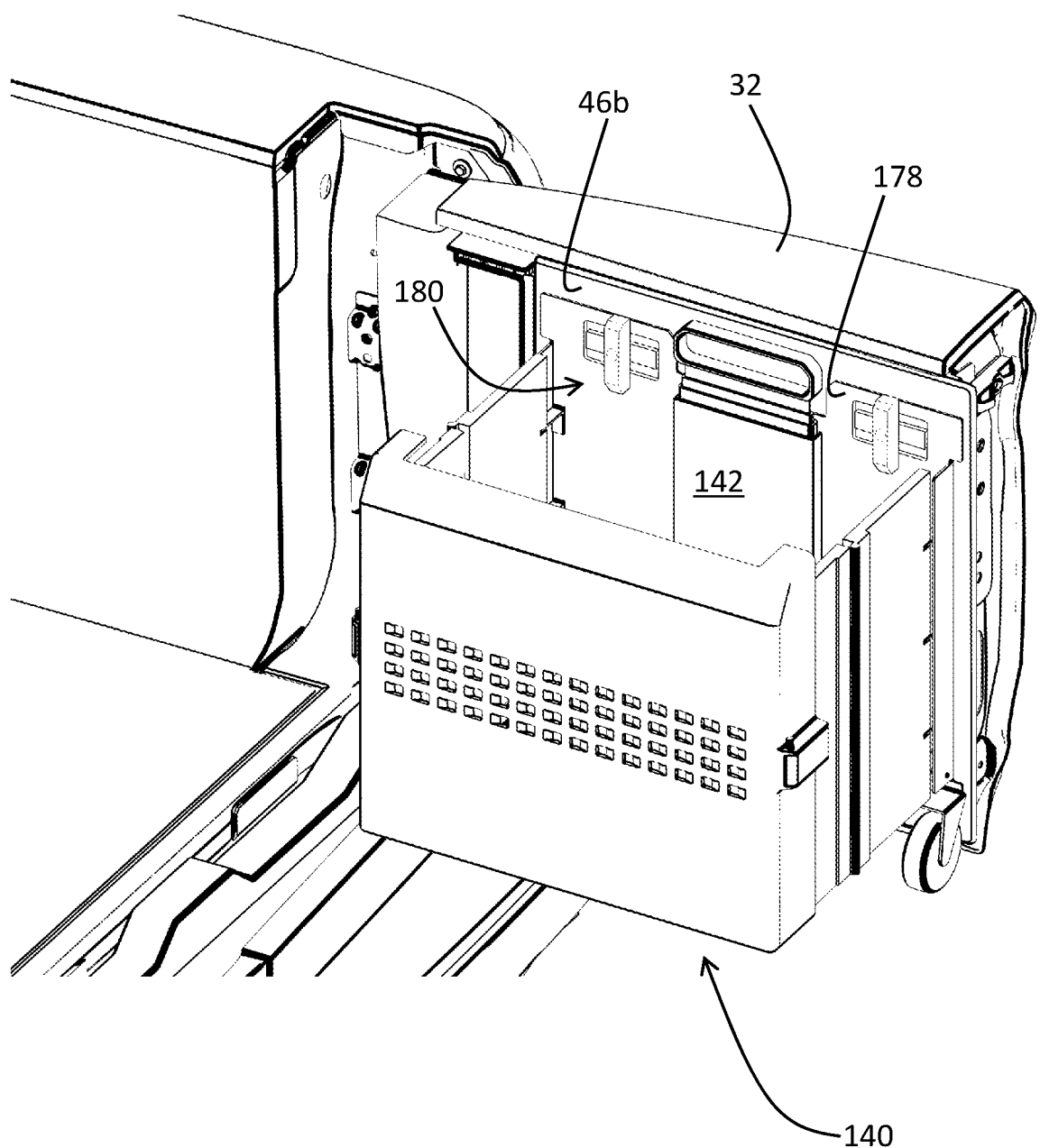
FIG. 18 is a front perspective view of the rolling cargo box of FIG. 17, shown in the fully opened position.

As shown in FIG. 17, the exemplary rolling cargo box 140 is shown in a first position, herein referred to as the stowed (closed) position. With reference to FIG. 18, the rolling cargo box 140 is shown in a second position, herein referred to as the deployed (open) position. In this state, the rolling cargo box 140 includes a cargo containment space 142 that is demarcated from the remainder of the cargo bed, permitting for greater accessibility and control over content contained therein.

Regardless of the configuration, the rolling cargo box 140 is configured to include a base member 178. The base member 178 releasably interfaces with the inner panel 46b of the second door 32 through the mounting system 180. In this way, the rolling cargo box 140 may be removed to permit a user the advantage of using it away from the vehicle.

Figure 19:
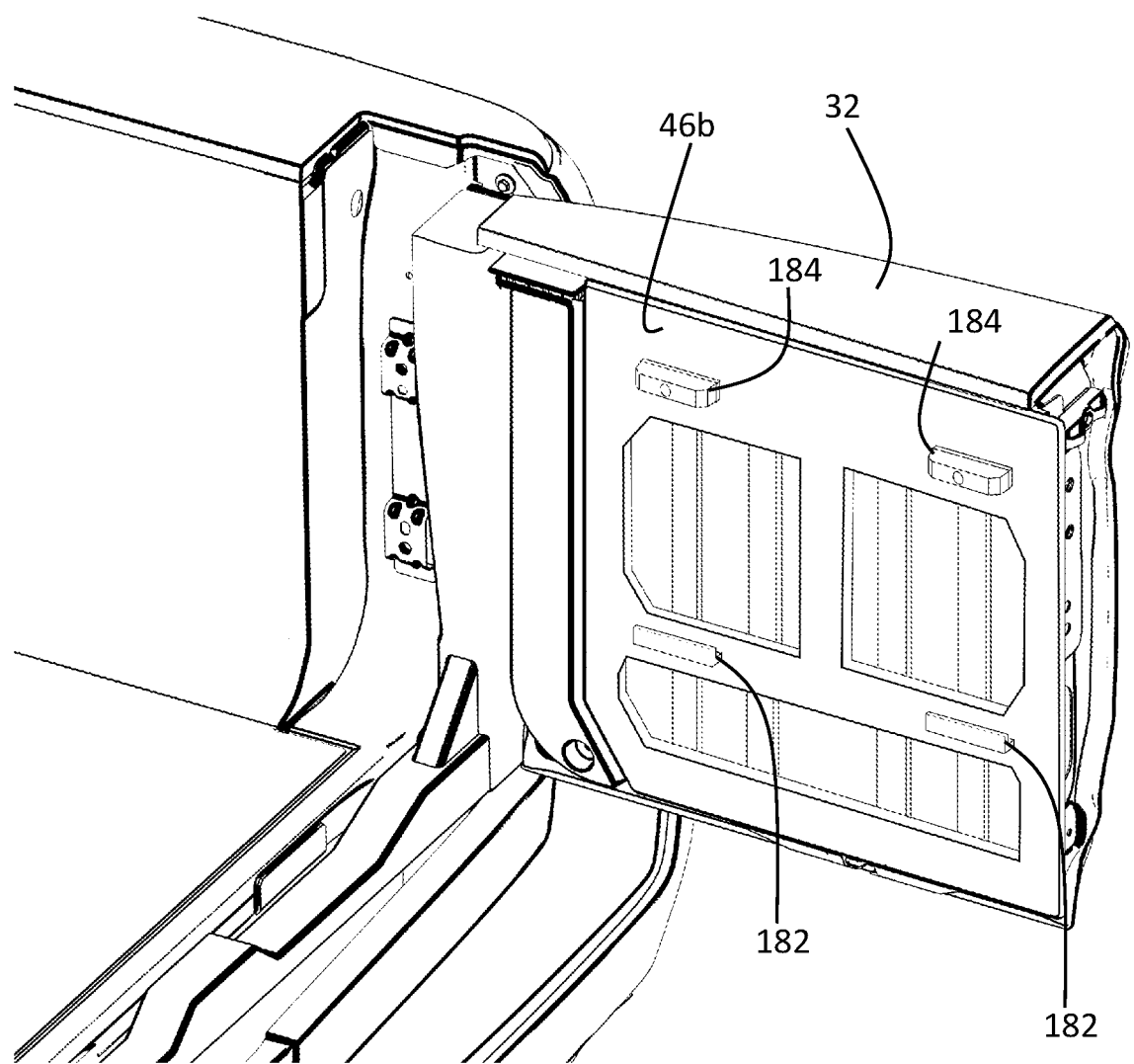
FIG. 19 is a perspective view of the inner panel of the second door, detailing aspects of the universal mounting system.

The mounting system 180 includes at least one hanger 182 and at least one locking member 184. As shown in FIG. 19, the mounting system 180 includes two hangers 182 and two locking members 184 on the inner panel 46b of the second door 32. The hangers 182 and locking members 184 are configured to cooperate with corresponding apertures on the base member 178 of the rolling cargo box 140. With specific reference to FIG. 20, the base member 178 of the rolling cargo box 140 is shown to include two locking member apertures 186 and two hanger apertures 188.

Figure 20:
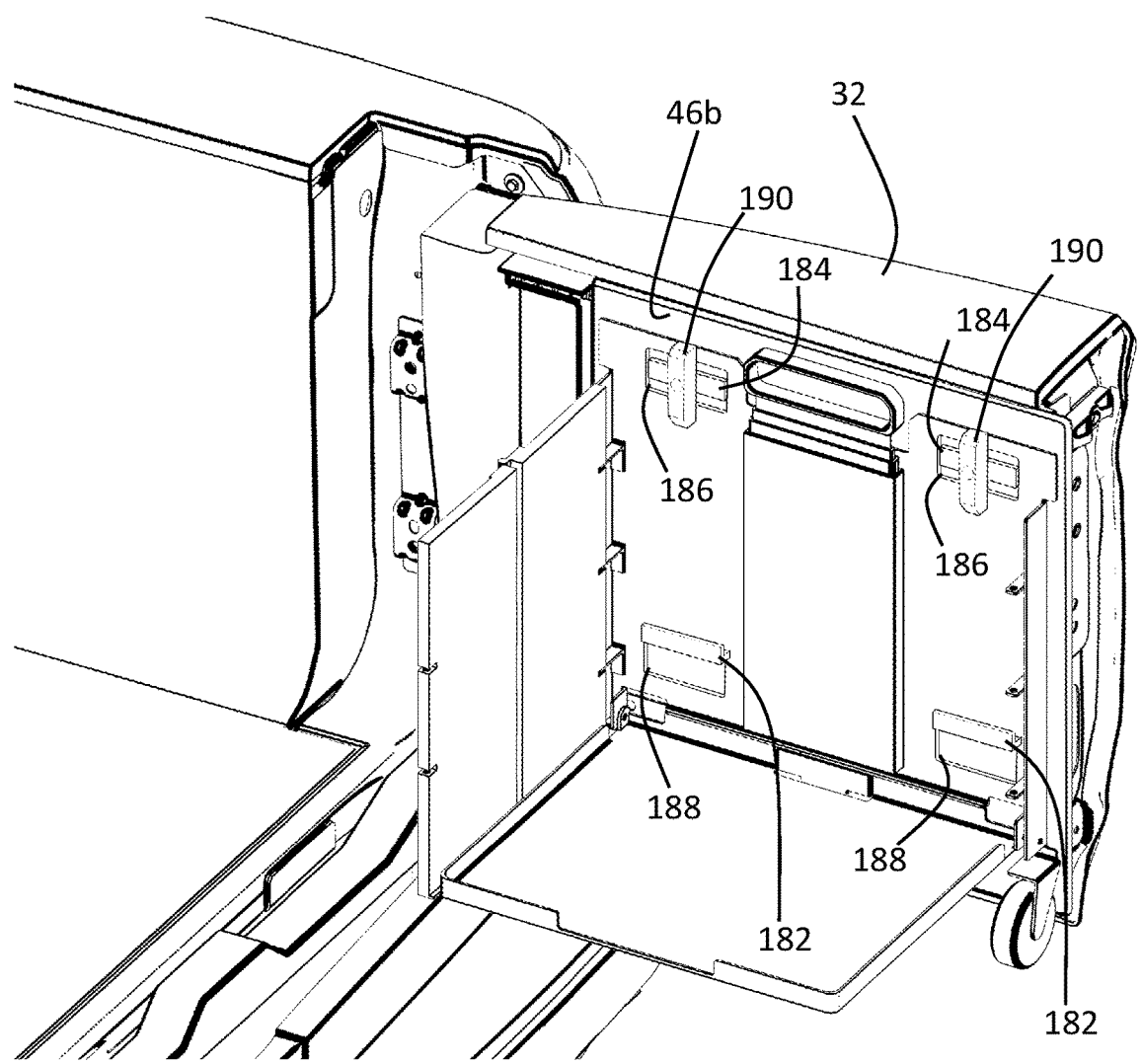
FIG. 20 is a front perspective view of the rolling cargo box of FIG. 17, with certain portions hidden to detail aspects of the universal mounting system.

The locking members 184 include as part of a locking mechanism to releasably attach the rolling cargo box 140. Examples of locking mechanisms may include but are not limited to a lock handle 190 configured for threaded or bayonet-style attachment, quarter-turn locks as well as push-pull locking systems. In general, the lock handle 190 is rotatable in a way that permits for mounting of the rolling cargo box 140 upon the base member in a first position (for example as shown in FIG. 19), and locks the accessory member upon the base in a second position (as shown in FIG. 20).

It will be appreciated that the interface between the base member 178 and the inner panel 46b with respect to the hangers 182 and the locking members 184 permits for the releasable attachment of the rolling cargo box 140. It will further be appreciated that other accessories may implement a similar base member into its design, to permit for a similar mounting upon the inner panel 46b. Stated differently, the demonstration of the mounting system 180 using the rolling cargo box 140 is exemplary, as a multitude of different accessories may be configured for use upon this mounting system.

Materials

The storage box 60, the rolling cargo box 140, and in particular any of the components that establish the overall structure of the assembly, for example the base members and the various panel elements may be manufactured from any suitable plastic material including, but not limited to—

Polypropylene (PP)— (glass-filled, or carbon-fiber filled)
Nylon/Polyamide (PA) (11, 12, 6, 66)— (glass-filled, or carbon-fiber filled)
High-density polyethylene (HDPE)
Acrylonitrile butadiene styrene (ABS)
Acrylonitrile butadiene styrene/polycarbonate (ABS-PC)
ethylene propylene diene monomer (EPDM)
polypropylene-ethylene propylene diene monomer (PP-EPDM)
TPE (thermoplastic Elastomers)

The use of plastics may be further enhanced by using fillers, including but not limited to natural fibers, glass fiber, virgin and/or recycled carbon fiber, colors/dyes, as well as fillers that confer UV resistance and/or chemical resistance. The panels could also be constructed out of polyurethane composite board sandwich materials, or other composite materials such as recycled carbon fiber boards, and be either injection molded, blow molded, compression molded, extruded, thermoformed or some combination of the aforementioned processes. It will also be appreciated that the storage box may be manufactured from a combination of materials.

While various embodiments according to the present invention have been described above, it should be understood that they have been described by way of illustration and example only, and not limitation. It will be apparent to persons skilled in the relevant art that various changes in form and detail can be made therein without departing from the scope of the invention. Thus, the breadth and scope of the present invention should not be limited by any of the above-described exemplary embodiments but should be defined only in accordance with the appended claims and their equivalents. It will also be understood that each feature of each embodiment discussed herein, and of each reference cited herein, can be used in combination with the features of any other combination. All patents and publications discussed herein are incorporated by reference herein in their entirety.

The invention claimed is:

1. A storage system for a split-configuration tailgate, the split-configuration tailgate including:
   a first door and a second door, the storage system comprising:
   a deployable storage box configured to be mounted on one of the first and second doors of the split-configuration tailgate, the storage box being deployable from a stowed position to a deployed position; and
   wherein: i) an interface between a base member of the storage box and an inner panel of one of the first and second doors is provided with a mounting system that permits the storage box to be removeable and ii) the mounting system includes at least one hanger and at least one locking member on the inner panel, the at least one hanger and the at least one locking member being configured to cooperate with corresponding apertures provided on the base member of the storage box.

2. The storage system according to claim 1, wherein the storage box is configured to be mounted upon an inner panel of one of the first and second doors.

3. The storage system according to claim 1, wherein the storage box has a closed arrangement in the stowed position and an open arrangement in the deployed position.

4. The storage system according to claim 3, wherein the storage box in the deployed position defines a cargo containment space that is demarcated from a cargo bed.

5. The storage system according to claim 1, wherein the storage box includes a forward wall that is moveable between a stowed position and a deployed position, and wherein the displacement of the forward panel to the deployed position permits for a first side panel and a second side panel to pivot about respective vertical axes to form respective first and second side walls of the deployed storage box.

6. The storage system according to claim 5, wherein the respective vertical axes are defined by respective hinges that attach the first and second side panels to a base member, the base member being attached to an inner panel of one of the first and second doors.

7. The storage system according to claim 6, wherein upon the displacement of the forward wall from the stowed position to the deployed position, a moveable floor panel is rotated about a horizontal axis from a stowed position against the base member, to a deployed position.

8. The storage system according to claim 1, wherein the storage box includes a locking mechanism to enable the storage box to be secured in the stowed position.

9. A storage system for a split-configuration tailgate, the split-configuration tailgate including:
a first door and a second door, the storage system comprising:
a removable storage box deployable from a stowed position to a deployed position, wherein the storage box includes a base member configured to be mounted on one of the first and second doors of the split-configuration tailgate, a forward wall, a first side panel, a second side panel, and a floor panel
a universal mounting system formed on the base member so that the base member is releasably coupled to an inner panel the first door;
wherein when the storage box is in the stowed position, the floor panel is oriented upright and against the base member,
wherein the forward wall is moveable and displacement of the forward wall causes each of the first and the second side panels to pivot on respective first and second hinges about a respective vertical axis, said first and second hinges respectively positioned at the interface between the base member and each of the first and second side panels, thereafter allowing the floor panel to rotate about a horizontal axis into the deployed position so that the floor panel is oriented horizontal and substantially perpendicular to the base member and opposing edges of the floor panel are supported on a lower edge of the first and the second side panels.

10. The storage system according to claim 9, wherein the storage box is configured to be mounted upon an inner panel of one of the first and second doors.

11. The storage system according to claim 9, wherein the storage box has a closed arrangement in the stowed position and an open arrangement in the deployed position.

12. The storage system according to claim 11, wherein the storage box in the deployed position defines a cargo containment space that is demarcated from the remainder of a cargo bed.

13. The storage system according to claim 9, wherein the storage box includes a locking mechanism to enable the storage box to be secured in the stowed position.

14. The storage system according to claim 9, wherein the mounting system includes at least one hanger and at least one locking member on the inner panel, the at least one hanger and the at least one locking member being configured to cooperate with corresponding apertures provided on the base member of the storage box.

* * * * *